United States Patent [19]
Takahashi et al.

[11] 4,122,513
[45] Oct. 24, 1978

[54] POWER CONTROL DEVICE

[75] Inventors: Hiroshi Takahashi, Yokohama; Shinichi Nakata, Kawasaki, both of Japan

[73] Assignee: Canon Kabushiki Kaisha, Tokyo, Japan

[21] Appl. No.: 705,799

[22] Filed: Jul. 16, 1976

[30] Foreign Application Priority Data

Jul. 23, 1975 [JP] Japan .................. 50-89830

[51] Int. Cl.² .......................................... H02M 3/335
[52] U.S. Cl. ........................................ 363/21; 363/49; 363/97
[58] Field of Search ................. 321/2, 45 S; 307/38, 307/64, 66; 340/248 R, 253 C; 363/49, 80, 89, 97, 20, 21

[56] References Cited

U.S. PATENT DOCUMENTS

| | | | |
|---|---|---|---|
| 3,237,081 | 2/1966 | Martin | 321/45 S |
| 3,289,098 | 11/1966 | Cannalte | 321/45 S |
| 3,351,770 | 11/1967 | O'Sullivan | 307/64 |
| 3,400,319 | 9/1968 | Stich | 321/2 |
| 3,435,320 | 3/1969 | Lee et al. | 321/2 |
| 3,815,354 | 6/1974 | Strocka et al. | 323/DIG. 1 X |
| 4,020,360 | 4/1977 | Udvardi-Lakos | 307/66 |
| 4,039,925 | 8/1977 | Fletcher et al. | 307/64 X |

*Primary Examiner*—William M. Shoop
*Attorney, Agent, or Firm*—Fitzpatrick, Cella, Harper & Scinto

[57] ABSTRACT

An electric power control arrangement comprises a voltage conversion circuit, a signal producing circuit for producing signals to enable the conversion circuit, and a voltage supplying circuit operative in response to the signals from the signal producing circuit for supplying a voltage to the voltage conversion circuit. The voltage conversion circuit may include a starting circuit operable in response to the output from the signal producing circuit. The power control arrangement may include a voltage regulator, which comprises a comparator for comparing the output of the regulator with a reference voltage to enable the starting circuit.

8 Claims, 3 Drawing Figures

POWER CONTROL DEVICE

BACKGROUND OF THE INVENTION

1. Field of the Invention

The present invention relates to a power control arrangement for reducing electric power consumption of electronic equipment, and is particularly adapted for use in battery-powered equipment.

2. Description of the Prior Art

In conventional battery-powered equipment, for example battery-powered calculators, there has been necessitated a voltage converting circuit, such as a DC-DC converting circuit, in order to obtain a necessary voltage level. Such a voltage converting circuit itself consumes a certain electric power, even in the absence of load, while the calculator is in use or the power switch thereof remains closed. For example, in a recording-type calculator in which the converted voltage is supplied to a printout unit as the driving power therefor, a considerably larger portion of the electric power is consumed in such a voltage converting circuit for purposes other than the essential purpose thereof, whereas the period of time in which the converted voltage is actually used for printing is very limited compared with the total period of use of the calculator.

SUMMARY OF THE INVENTION

An object of the present invention is, therefore, to provide a power control arrangement in which the abovementioned difficulties are removed.

Another object of the present invention is to provide a power control arrangement which prolongates the available period of battery-powered electronic equipment.

Still another object of the present invention is to provide a power control arrangement which interrupts the function of a voltage converting circuit whenever the converted voltage is not required by the load and restores the function, taking into consideration of the period required for the stabilization of the voltage converting circuit before the converted voltage becomes required by the load, thereby performing the normal function of the voltage converting circuit only while the converted voltage is required.

Other objects and advantages of the present invention will be clarified from the following description of the preferred embodiment with reference to the attached drawings.

DESCRIPTION OF PREFERRED EMBODIMENTS

Now the present invention will be explained in detail with reference to an embodiment thereof applied in an electronic appliance, for example, a recording type calculator.

Figure 1:
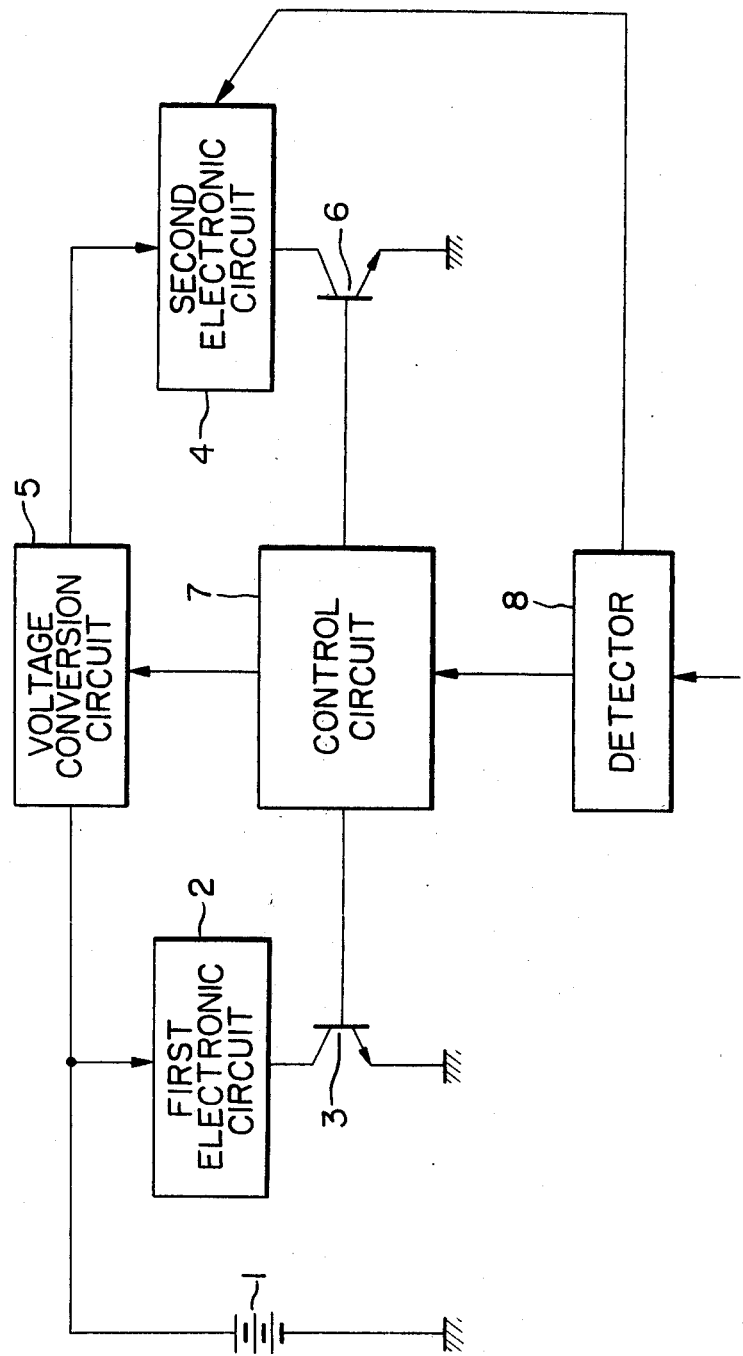
FIG. 1 is a block diagram showing an embodiment of the power control arrangement according to the present invention.

Referring to FIG. 1 showing the block diagram of such an appliance, numeral 1 designates a battery for supplying electric power to the recording type calculator, and 2 a first electronic circuit constituting a part of the calculator and driven by the voltage supplied by the battery, which circuit forms a closed loop with battery 1 through a switching transistor 3.

The battery 1 is also connected to a voltage conversion circuit 5 in order to supply electric power to a second electronic circuit 4 which requires a higher voltage, and the circuit 4 is constructed in such a manner that the electric supply can be selectively discontinued by means of a switching transistor 6. The switching transistors 3 and 6 are opened or closed by the signals supplied by a control circuit 7 which also supplies control signals to voltage conversion circuit 5. Such a control circuit 7 is so constructed as to generate the control signals upon receipt of signals from detector means which detects the control signals of the electronic appliance provided with such a power control arrangement or the signals obtained in response to the operation to such an electronic appliance, and which can be composed of a decoder receiving the instruction code signals developed from the calculator.

Figure 2:
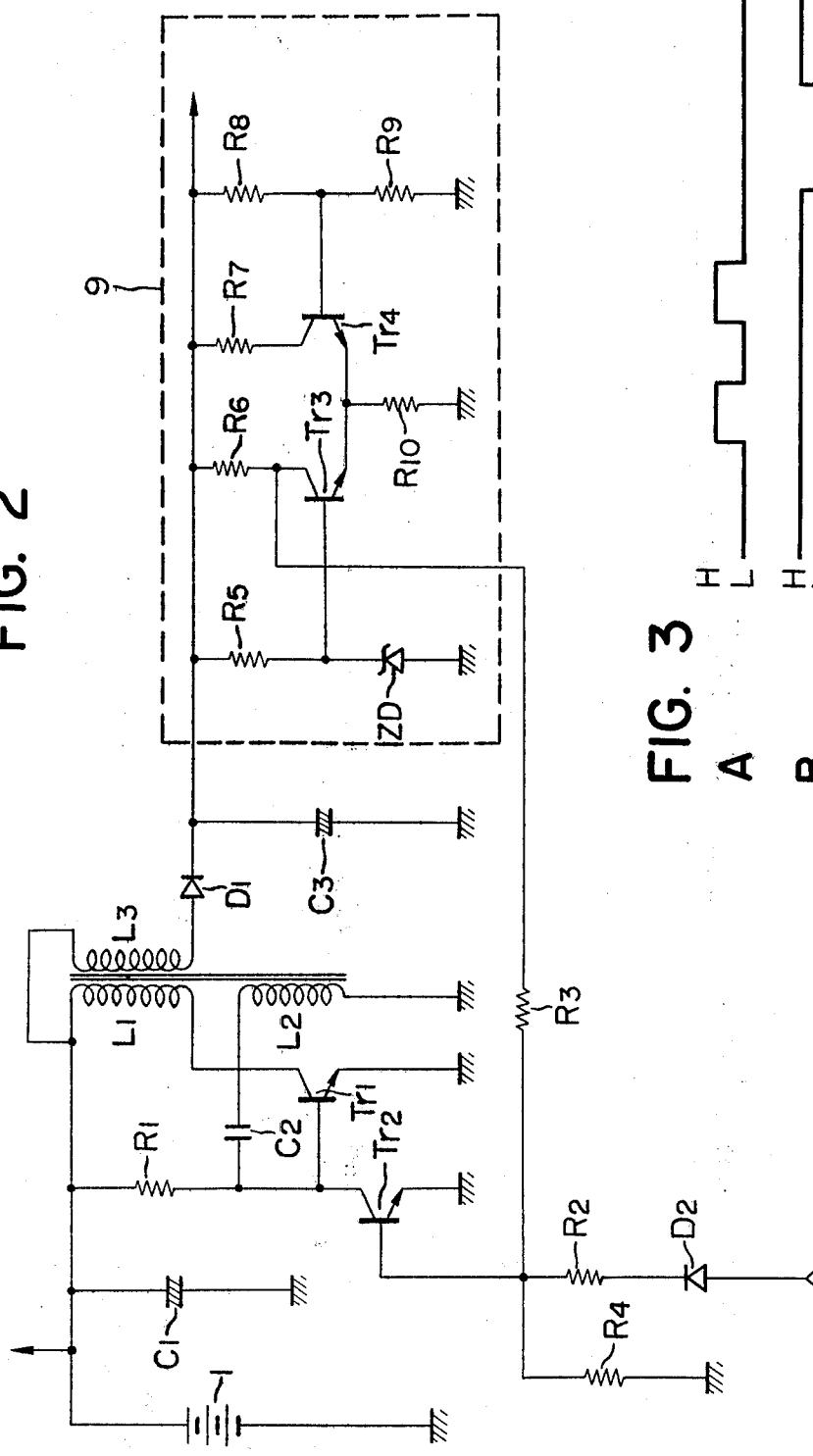
FIG. 2 is a detailed circuit diagram showing the voltage converting circuit shown in FIG. 1.

Now referring to FIG. 2 showing a detailed circuit of the voltage conversion circuit 5 of which the power supply is controlled by control circuit 7, numeral 1 denotes the battery shown in FIG. 1, C1 a smoothing capacitor, and a resistor R1, a capacitor C2, a transistor Tr1 and inductors L1, L2 and L3 constitute a self-oscillating inverter which converts the voltage of battery 1 into an alternating voltage thereby producing a different voltage across the secondary winding L3. The transistor Tr1 constituting a part of the inverter is controlled by transistor Tr2 which is either opened or closed in response to the signals from control circuit 7 shown in FIG. 1 in such a manner that the transistor Tr1 is placed in its OFF state to terminate the oscillation of the inverter when transistor Tr2 is in its ON state. In this state, therefore, the current in the winding L1 is reduced to zero, and the power consumption in the inverter is accordingly reduced. The transistor Tr2 is also connected to resistors R3 and R4 so as to receive, when the voltage across the inductor L3 deviates from the determined voltage, a feedback signal from a transistor Tr3 connected to a Zener diode ZD, which applies a reference voltage to a differential amplifier constituting a constant voltage circuit 9.

Also a resistor R2 and a diode D2 are connected in the feedback loop of constant voltage circuit 9 in order to transmit the signals from control circuit 7 to transistor Tr2, which thus receives a sum of the feedback signal and the signal from control circuit 7.

Now in the following there will be given an explanation on the operation of the power control arrangement of the present invention constructed as explained above.

Figure 3:
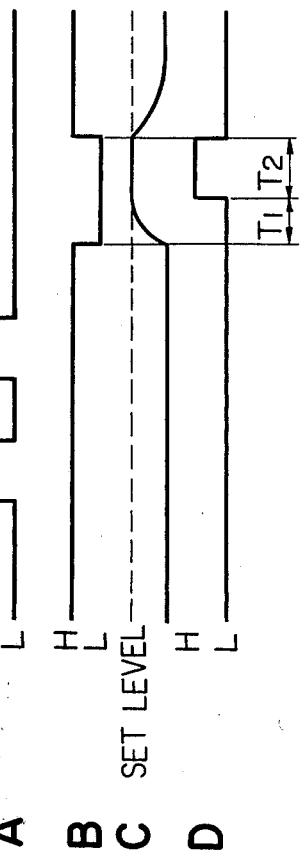
FIG. 3 is a chart showing the signal wave forms.

The control circuit 7, upon receipt of the signal as shown in FIG. 3(A) from the detector 8, turns the transistor 3 ON in order to permit the first electronic circuit 2 to be supplied with the power from the battery 1. Also in case the second electronic circuit 4 is a recording unit requiring a voltage higher than that of battery 1, upon detection by the detector 8 of the signals developed from the arithmetic or the input unit of the calculator, the control circuit 7 generates the signal as shown in FIG. 3(B), which starts or terminates the function of voltage conversion circuit 5. Upon application of a low-level signal from the control circuit 7 to the control terminal of the transistor Tr2 shown in FIG. 2, transistor Tr2 is shifted to its OFF state and the transistor Tr1 is repeatedly opened and closed according to the potential changes at the node between the resistor R1 and the capacitor C2, thus forming an intermittent current in the inductor L1 and transistor Tr1 and accordingly inducing a voltage in the inductor L3, which is rectified by a diode D1 and supplied to the second electronic circuit 4 in the form of the wave shown in FIG. 3(C) after passing the constant voltage circuit 9. After the lapse of a determined period, for example T2, from the start of application of a low-level signal to the voltage conversion signal 5, the control circuit 7 produces a high-level signal as shown in FIG. 3(D) for turning the transistor 6 ON for a period T2 during which the second electronic circuit 4 is energized to perform recording. Whenever the voltage supplied to the second electronic circuit 4 deviates from the determined value, the transistor Tr2 will be supplied from the constant voltage circuit 9 with the signal for causing the output voltage to recover the determined value, thereby constantly maintaining the output voltage of circuit 9 at the determined value. The above-mentioned signal for controlling the transistor 6 after the lapse of period T1 from the start of low-level signal supplied from the control circuit 7 to the voltage conversion circuit 5 can be obtained by a delay circuit or a timer. The maximum of period T2, during which the necessary printout of the result of calculation is performed, can be predetermined in advance, and the corresponding signal can be generated by the control circuit 7 if it is provided with a circuit functioning as a timer upon receiving the signal from the detector 8.

In the above-mentioned voltage conversion circuit a current is supplied, when the transistor Tr2 is in its ON state, from the battery 1 through the winding L3 to the constant voltage circuit 9, thus causing a certain power consumption. However, in case the windings L3 and L1 are so designed as to produce a voltage across winding L3 higher than that of battery 1, the current, and accordingly the power consumption, are very small when the inverter is not in function since the constituent elements of the constant voltage circuit have been selected with respect to the higher voltage.

What is claimed is

1. In an electrical apparatus including a load which is required to be energized only intermittently during operation of the apparatus, an improvement which comprises a power control circuit device for intermittently supplying power from a power source to the load, said power control circuit device comprising:
    a voltage conversion circuit for converting a voltage supplied from the power source, and having an output for applying the converted voltage to the load;
    detector means for providing an output signal when power should be supplied from said power source to energize said load;
    a control circuit responsive to the signal from said detector means for producing a control signal; and
    switch means responsive to the control signal from said control circuit for enabling the operation of said voltage conversion circuit to provide the converted voltage at said output for application to the load.

2. A power control circuit device according to claim 1, wherein said switch means comprises a switching circuit operable in response to the control signal from said control circuit to complete a current path through the load.

3. In an electrical apparatus including a load which is required to be energized only intermittently during operation of the apparatus, an improvement which comprises a power control circuit device for intermittently supplying power from a DC power source to the load, said power control circuit device comprising:
    a DC-DC converting circuit for effecting a DC-DC conversion of a voltage supplied from the DC power source, and having an output for applying the converted voltage to the load;
    detector means for providing an output signal when power should be supplied from the power source to energize said load;
    a control circuit for producing a control signal in response to the signal from said detector means; and
    switch means responsive to the control signal from said control circuit for enabling the operation of said DC-DC converting circuit to provide the converted voltage at said output for application to the load.

4. In an electrical apparatus including a load which is required to be energized only intermittently during operation of the apparatus, an improvement which comprises a power control circuit device for intermittently supplying power from a DC power source to the load, said power control circuit device comprising:
    a DC-DC converter for effecting a DC-DC conversion of a voltage supplied from the DC power source, wherein said converter includes a switching circuit for enabling operation of the conversion;
    a constant voltage circuit having an input voltage applied thereto from said DC-DC converter, and having an output for applying a voltage to the load, said constant voltage circuit further including a comparator for comparing the output of said DC-DC converter with a reference voltage, and for providing a difference signal output coupled to said switching circuit in said DC-DC converter;
    detector means for providing an output signal when power should be supplied from said DC power source to energize said load; and
    a control circuit for producing a control signal in response to the signal from said detector means, the control signal from said control circuit being applied to said switching circuit together with the difference signal from said comparator to operate said switching circuit.

5. A power control circuit device according to claim 4, wherein said switching circuit comprises a switch and means for adding the difference signal from said comparator and the control signal from said control circuit, wherein said switch is controlled in response to the output of said adding means.

6. In an electrical apparatus including a load which is required to be energized only intermittently during operation of the apparatus, an improvement which comprises a power control circuit device for intermittently supplying power from a DC power source to the load, said power control circuit device comprising:
    a DC-DC converter for converting a DC voltage supplied from the DC power source, wherein said converter includes a switching circuit for enabling and disabling the generation of a converted voltage, and wherein said switching circuit has first and second control signal inputs;

a stabilizing circuit connected to said DC-DC converter and having an output for supplying a voltage to the load, said stabilizing circuit including a reference signal generating circuit and a comparing circuit for comparing the output of said reference signal generating circuit with the output of said DC-DC converter, wherein the difference signal output of said comparing circuit is coupled as said first control signal input to said switching circuit for controlling the operation thereof;

detector means for providing an output signal when power should be supplied from said DC power source to energize said load; and a control circuit responsive to the signal from said detector means for producing a signal which is coupled as said second control signal input to said switching circuit for controlling the operation thereof.

7. A power control circuit device according to claim 6, wherein said switching circuit comprises circuit means for adding the difference signal from said comparing circuit and the control signal from said control circuit, and a switch responsive to the output of said adding circuit means for controlling the operation of said DC-DC converter.

8. A power control circuit device according to claim 1, wherein said detector means comprises a decoder for decoding a signal received from an external circuit.

* * * * *